E. J. BLOOD & E. B. THOMAS.
Harvester-Cutters.

No. 147,549. Patented Feb. 17, 1874.

Witnesses,
A. Schottenberg
Chis. Fink

Inventors,
Edwin J. Blood
Edwin B Thomas
By J. B. Smith
their Atty in fact

UNITED STATES PATENT OFFICE.

EDWIN J. BLOOD AND EDWIN B. THOMAS, OF VERNON, WISCONSIN.

IMPROVEMENT IN HARVESTER-CUTTERS.

Specification forming part of Letters Patent No. 147,549, dated February 17, 1874; application filed August 29, 1873.

*To all whom it may concern:*

Be it known that we, EDWIN J. BLOOD and EDWIN B. THOMAS, of Vernon, in the county of Waukesha, in the State of Wisconsin, have invented certain Improvements in Cutters for Harvesters and Mowers, of which the following is a specification:

Our invention relates to that class of cutters in which the knives move with an endless chain, and avoid a vibrating motion; and it consists in the form or shape of the knives and the manner of attaching them to the chain.

These knives have heretofore been constructed with, and as a part of the chain, and therefore could not be removed except by taking the chain to pieces. The object of our improvement is to avoid this difficulty, and at the same time provide a knife which may have four cutting-edges.

Figure 1:
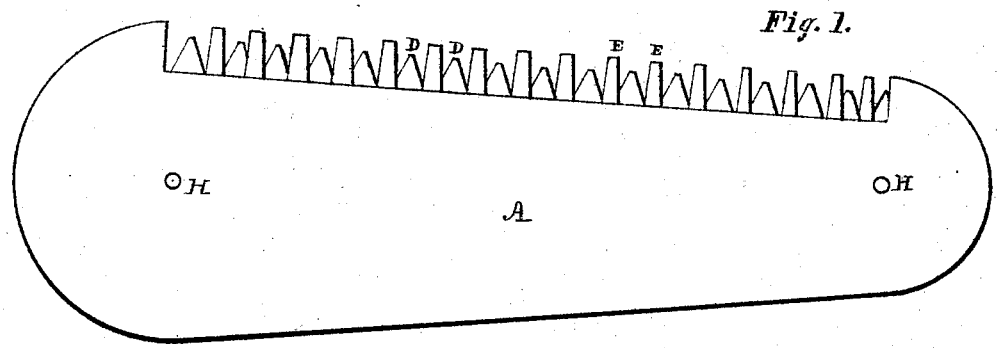
Figure 2:
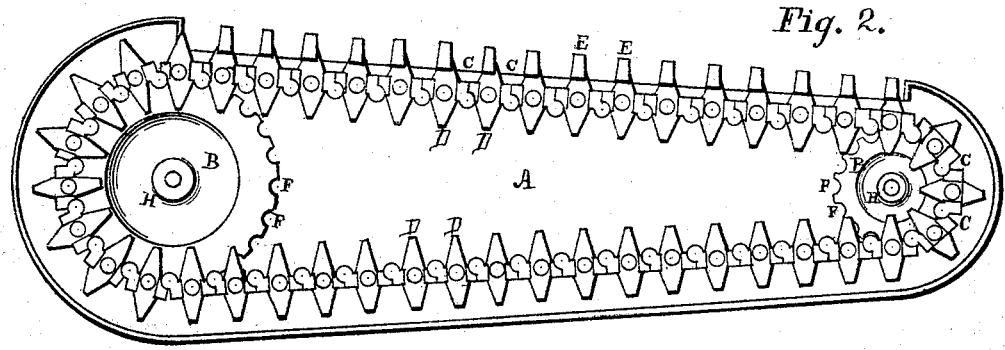
Figure 3:
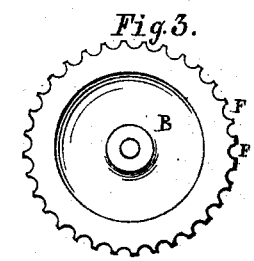
Figure 4:
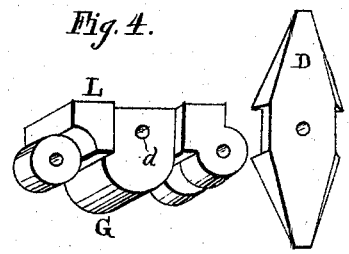

Figure 1 is a view of the cutters in position for work. Fig. 2 is a view of the cutters and cutter-bar with the top cover removed, showing the inside mechanism. Fig. 3 is a view of one of the operating-wheels, by which the cutters are operated; and Fig. 4 is a view of one of the links of the chain and a cutter-section.

A is the frame, in which the cutters are located; B B, the wheels, around which the cutters play; C, the chain, to which the cutters are attached; D, the cutters; E, the guards, which protect the ends of the cutters; F, openings in the periphery of the wheel, into which fits the projection on the middle of each link, and prevents the chain from slipping; G, projection on the links; H H, cutter-shafts, on which wheels B run. The knives D are secured separately to the middle of the links L, by the screws $d$, and hence they can be readily removed or taken off for sharpening or repairing. Each end of the knives can be formed with cutting-edges, so that when dulled in one position, the knives can be quickly reversed, so as to present fresh cutting-edges to the grain, and avoid the delay necessarily occasioned by having to sharpen the knives.

This arrangement of cutters is run in either direction by a cog-wheel, or by a crank connected with the driving-wheel of a harvester or of a mower, and as the wheel is moved the cutters travel right along, and as the grain or grass comes in between the guards it is cut and falls onto the platform; and when the knives get dull cutting on one side, then reverse the motion, and cut till the other side gets dull. When the front end gets dull, then take out the knives, and turn them round, and cut with the other end, thus having four cutting-edges to the knives.

The links of the chain are made in that peculiar form that they open and close as they pass round the wheels, and fit exactly to the periphery of the wheels as they pass round them.

Having thus described our invention, what we claim as new, and desire to secure by Letters Patent, is—

The removable knives D, constructed as described, so as to use the ends alternately for cutting, in combination with the endless chain C formed of the links L, the guards E, and cog-wheels B, when the several parts are constructed and arranged as and for the purpose set forth.

EDWIN J. BLOOD.
      EDWIN B. THOMAS.

Witnesses:
 AARON PUTNAM,
 ELVIRA PUTNAM.